United States Patent
Lowery

(10) Patent No.: US 12,536,088 B2
(45) Date of Patent: Jan. 27, 2026

(54) ADAPTIVE HETEROGENEOUS APPLICATION PROFILING

(71) Applicant: ADVANCED MICRO DEVICES, INC., Santa Clara, CA (US)

(72) Inventor: Keith Lowery, Garland, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 195 days.

(21) Appl. No.: 18/215,876

(22) Filed: Jun. 29, 2023

(65) Prior Publication Data
US 2025/0004906 A1  Jan. 2, 2025

(51) Int. Cl.
G06F 11/34 (2006.01)
G06F 11/30 (2006.01)

(52) U.S. Cl.
CPC ........ G06F 11/3466 (2013.01); G06F 11/302 (2013.01); G06F 11/3409 (2013.01); G06F 2201/865 (2013.01)

(58) Field of Classification Search
None
See application file for complete search history.

(56) References Cited

U.S. PATENT DOCUMENTS

| | | | |
|---|---|---|---|
| 2012/0108330 A1* | 5/2012 | Dietrich, Jr. | H04N 21/235 463/31 |
| 2017/0060635 A1* | 3/2017 | Wu | G06F 9/5011 |
| 2017/0185409 A1* | 6/2017 | de Paula Rosa Piga | G06F 11/3409 |
| 2017/0286260 A1* | 10/2017 | Baartmans | G06F 11/36 |
| 2019/0042259 A1* | 2/2019 | Levit-Gurevich | G06T 1/20 |
| 2019/0286971 A1* | 9/2019 | Che | G06F 11/3024 |
| 2020/0081513 A1* | 3/2020 | Lee | G05F 1/66 |
| 2020/0379864 A1* | 12/2020 | Haberstro | G06T 15/005 |
| 2021/0117202 A1* | 4/2021 | Levit-Gurevich | G06F 11/3632 |
| 2022/0391248 A1* | 12/2022 | Chaudhari | G06F 9/4881 |
| 2023/0109752 A1* | 4/2023 | Levit-Gurevich | G06F 11/3409 717/128 |
| 2023/0222017 A1* | 7/2023 | Schmitt | G06F 9/545 719/328 |
| 2024/0134775 A1* | 4/2024 | Jo | G06F 11/3419 |

* cited by examiner

*Primary Examiner* — Qing Chen

(57) ABSTRACT

Techniques are described for adaptive application profiling, such as for adaptively collecting profiling runtime data for an application running on heterogeneous processing architectures. A first set of profiling data is collected from a first set of tracking circuitry during execution of an application by one or more processors. During the execution of the application and based on the first set of profiling data, a second set of tracking circuitry is determined for use in collecting additional profiling data for the application, the second set of tracking circuitry being distinct from the first set of tracking circuitry. A second set of runtime profiling data is collected from the second set of tracking circuitry.

17 Claims, 4 Drawing Sheets

```
import re
import os
```

- 305 Get regex
```
if 'RS_PLUGIN_PARMS' in os.environ:
    rx = os.environ['RS_PLUGIN_PARMS']
else:
    rx = input("Enter regex for kernel matching: ")
```

- 310 Veto non-matching kernel names
```
def vetoDispatch(info):
    global rx
    x = re.search(rx, info['kp_']['name_'])
    if x:
        return False
    else:
        return True
```

- 315 Introduce artificial kernel delay (in ns)
```
def getDelay(info):
    return 0
```

- 320 Launch properties & context
```
{
 'dispatch_': 2710,
 'gpu_id_': 2,
 'queue_id_': 1,
 'pid_': 101125,
 'tid_': 101125,
 'grid_': 2560,
 'workgroup_': 32,
 'lds_': 0,
 'scratch_': 0,
 'sig_': 140441194732345,
```

- 325 Kernel properties
```
 'kp_':
    {'vgpr_': 2,
     'sgpr_': 1,
     'fbar_': 0,
     'name_': 'void kernel<5000, 1>(double*) [clone .kd]',
     'kernel_object_': 140436495304064
    }
}
```

FIG. 3

ADAPTIVE HETEROGENEOUS APPLICATION PROFILING

BACKGROUND

The present disclosure relates to the field of computer software development, and more specifically to application profiling tools. Application profiling is a technique used in software development to analyze the performance of a software application and identify areas that could be optimized. Application profiling tools measure various aspects of an application's performance (e.g., processor utilization, memory usage, and I/O operations), and provide developers with insights into how their software application is performing.

However, existing profiling tools can be computationally expensive and require significant amounts of time to generate profiling information. This can be a significant hindrance to developers who desire to quickly and efficiently optimize their applications.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 illustrates computer-readable code 30 implementing an example of filtering application profiling data during runtime based on regular expressions, in accordance with some embodiments.

DETAILED DESCRIPTION

Figure 1:
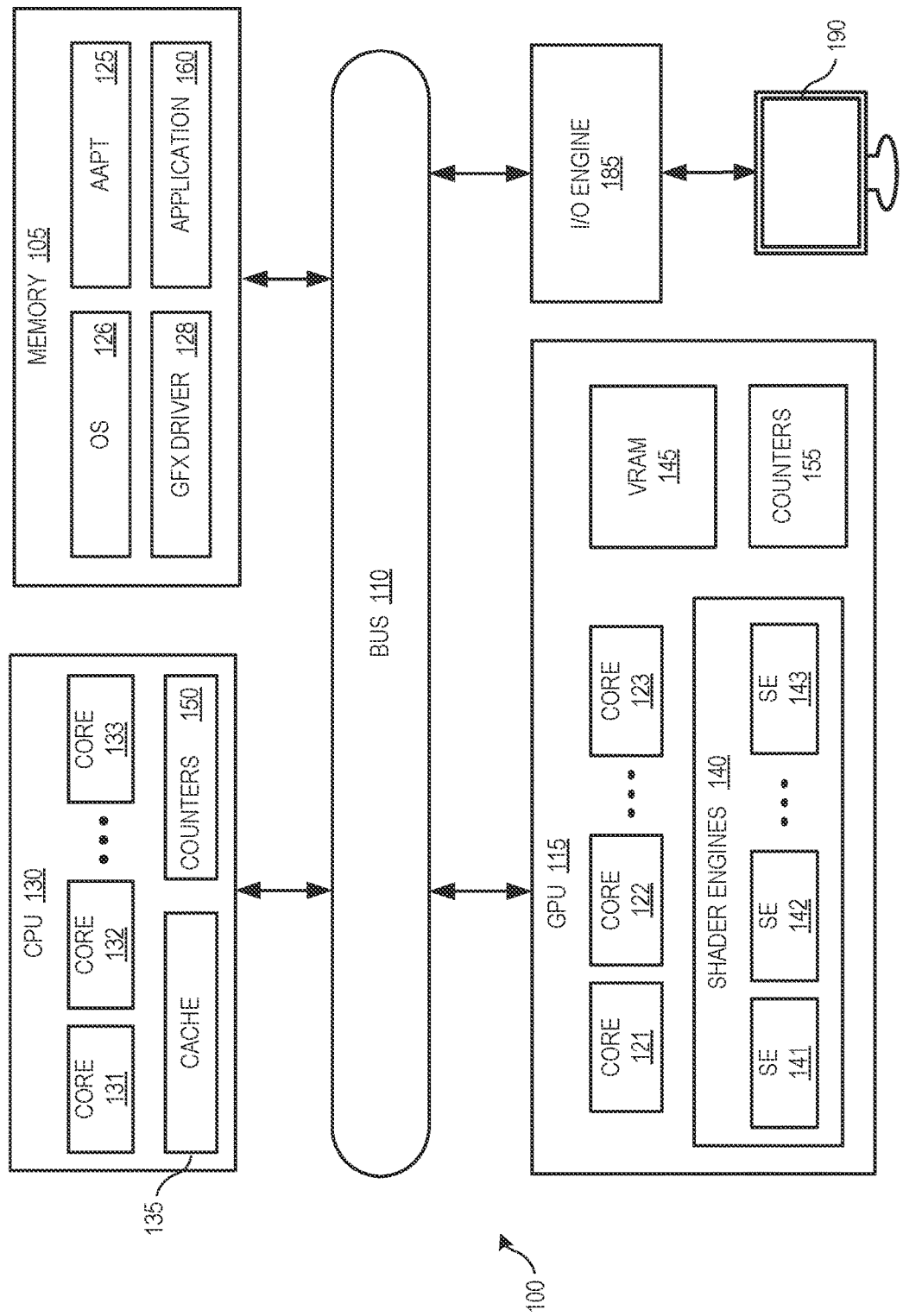
FIG. 1 is a block diagram of a heterogeneous processing system implementing an adaptive application profiling tool (AAPT), in accordance with some embodiments.

Heterogeneous processing architectures employ multiple types of processors within a single computing system, such as a computing system comprising both central processing units (CPUs) and graphics processing units (GPUs). As the use of heterogeneous CPU-GPU architectures in software development has increased, so has the need for tools to analyze and optimize performance. Profiling tools are commonly used to collect performance data during application execution, which can then be analyzed to identify bottlenecks and improve performance.

As used herein, a dispatch packet or command (or simply dispatch) refers to a command for launching a GPU kernel, which is a program that runs on the GPU and performs a specific task such as image processing or matrix multiplication. Typically, a host CPU initiates the kernel execution by issuing a dispatch command to the GPU. The dispatch command specifies, for example, dimensions of a grid of process threads that will execute the kernel, as well as dimensions of each thread block. The GPU then creates and launches the specified number of threads to execute the kernel code.

The profiling of heterogeneous applications often involves millions of separate kernel dispatches, and therefore may easily overwhelm current application profiling tools. In particular, significant time may be lost capturing large amounts of profiling information during execution of application despite a significant portion of that profiling information being unnecessary. Such unnecessary profiling information is often captured because current application profiling tools typically offer limited filtering capabilities, making it difficult to target particular portions of code that are of interest.

Embodiments of techniques described herein relate to adaptive application profiling, such as for adaptively profiling heterogeneous applications running on CPU-GPU architectures, including dynamically collecting and filtering performance data during execution of such applications. In certain embodiments, such techniques are implemented via an Adaptive Application Profiling Tool (AAPT). The AAPT provides adaptive data collection from one or both of system CPU and GPU circuitry, enabling more sophisticated and nuanced application profiling and execution tracing than in previous approaches. In addition, the AAPT provides a generalized architecture for implementing a variety of adaptive application profiling schemes, facilitating high developer productivity by iterating faster and drawing attention to code portions of interest or even specific dispatches of a particular kernel of interest based on varied and dynamic criteria.

In various embodiments, the AAPT utilizes a variety of available hardware tracking circuitry such as hardware counters on both the CPU and GPU. Such hardware counters are typically implemented in circuitry of the incorporating processor and are designed to provide performance data for a variety of hardware events, such as cache hits and misses, pipeline stalls, and instructions executed. As used herein, reference to hardware counters may include any of various counters, hardware-generated traces, and/or other hardware-provided indicators (e.g., one or more indicators of current execution location within an executing kernel).

Embodiments described herein provide an interface for the collection of hardware counter data that is both generic and extensible. This allows the AAPT to collect a broad range of performance data beyond simple cycle counts and cache misses, such as energy consumption and instruction-level data. In addition, beyond the specificity of data collection enabled by such embodiments, the specific data being collected may be modified based on dynamic and/or computed criteria (in contrast, for example, to collecting profiling data based on a preestablished static configuration) during a single execution cycle. Moreover, this adaptive approach enables the collection of performance data with a relatively low overhead when compared to previous profiling methods. By utilizing hardware counters in this manner, embodiments enable acquisition of more fine-grained performance data than in previous profiling approaches, allowing developers to better understand how their application is performing and to identify areas that may be causing performance bottlenecks. In contrast, previous profiling approaches typically rely on coarse-grained data collection methods, which can lead to inaccuracies in performance data.

In addition, AAPT hardware counter utilization provides developers with the ability to profile both the CPU and GPU portions of an application. This is particularly important for heterogeneous applications that split computation between these two processing units, as it allows developers to identify performance bottlenecks that may exist between the two processing units. In contrast, previous profiling approaches typically provide data on the CPU or GPU, but not both, which can make it difficult to identify performance issues that are specific to the GPU. By collecting performance data across different types of processing elements, the AAPT provides a more comprehensive view of a profiled application's performance relative to previous profiling approaches.

In certain embodiments, the AAPT includes various functions to provide enhanced control of data collection during profiling executions. As non-limiting examples, such functions may configure the AAPT to select whether a particular dispatch should be vetoed for data collection; whether the profiler should inject artificial delays in issuing a dispatch, such as to explore the potential effects of improving individual kernel performance on end-to-end application times; and to modify or confirm one or more sets of particular hardware counters to be collected for a specific dispatch. Among other benefits, such facilities enable dynamic selection of counters of interest based on, e.g., identified results from one or more previous dispatches, including previous dispatches from the same application execution. As discussed in greater detail elsewhere herein, these facilities aid in guided program optimization and for dealing with scalability issues in runtime data collection.

In some embodiments, one or more of these and other functions may be implemented via a plug-in architecture that operates as part of, or in conjunction with, the AAPT. In this manner, the plug-in is enabled to dynamically modify and adapt runtime data collection. As used herein, a plug-in is a modular extension that can be added to an existing application program or tool to add or enhance one or more features. In certain embodiments, such a plug-in comprises an extended code module that can be installed, uninstalled, or updated independently of the main application program or tool, which may include a more fixed set of features. In certain embodiments, this type of plug-in architecture enables configuration and/or modification of control data collection at runtime by simply implementing a plug-in using a variety of programming languages.

FIG. 1 illustrates a high-level block diagram of a heterogeneous processing system 100 implementing an adaptive application profiling tool, in accordance with some embodiments. The system includes a central processing unit (CPU) 130 and a graphics processing unit (GPU) 115, both connected to and communicating via a shared bus 110. In general, the processing system 100 may include any of a variety of accelerator units, parallel processors, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof.

The CPU 130 includes multiple CPU cores 131-133 (also termed compute units) and a CPU cache 135. The GPU 115 includes multiple GPU cores 121-123 and shader engines 140, as well as a local graphics memory 145. Both the CPU 130 and GPU 115 incorporate hardware counters, with the CPU counters 150 and the GPU counters 155 reflecting various operations of the respective CPU and GPU.

In the embodiment of FIG. 1, CPU 130 includes multiple CPU processing cores 131, 132, 133 (collectively, processing cores 131-133), representing an M number of cores. As the number of processing cores implemented in the CPU 130 is a matter of design choice, in various implementations the CPU 130 can include any number M of processing cores 131-133. In operation, the processing cores 131 to 133 execute instructions stored in a memory 105, such as concurrently or in parallel, and the CPU 130 stores information (e.g., results of the executed instructions) in the memory 105. In some embodiments, one or more of the processing cores 131-133 each operate as one or more compute units (e.g., Single Instruction Multiple Data or SIMD units) that perform the same operation on different data sets. The CPU 130 is also able to initiate graphics processing by issuing draw calls to the GPU 115.

Similarly, GPU 115 includes multiple GPU processing cores 121, 122, 123 (collectively, processing cores 121-123), representing an N number of cores. As the number of processing cores implemented in the GPU 115 is a matter of design choice, in various implementations the GPU 115 can include any number of processing cores 121-123. The GPU 115 further includes a plurality of shader engines 140, which in the depicted embodiment includes shader engines 141, 142, 143. In various embodiments, shader engines 140 may include any number of shader engines, each of which potentially comprises one or more additional cores or compute units (not shown).

The processing system 100 further includes or is communicatively coupled to the memory 105 or other storage component implemented using a non-transitory computer-readable medium, such as a dynamic random-access memory (DRAM). However, in embodiments, the memory 105 is implemented using other types of memory, including (as non-limiting examples) static random-access memory (SRAM), nonvolatile RAM, and the like. According to embodiments, the memory 105 includes an external memory implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

It will be appreciated that while for ease of illustration CPU counters 150 are depicted separately within the CPU 130 from CPU cores 131-133, in various scenarios and embodiments, each of CPU cores 131-133 may itself include one or more of CPU counters 150. Similarly, although for ease of illustration GPU counters 155 are depicted as being generally included within the GPU 115, in various scenarios and embodiments each of GPU cores 121-123, local graphics memory 145, and/or shader engines 140 may include one or more of the GPU counters 155.

In the depicted embodiment, the memory 105 stores and/or executes an implementation of an AAPT 125 for adaptively profiling an application 160. In the depicted embodiment, application 160 is a heterogeneous application, such that the execution of the application 160 includes tasks for both CPU 130 and GPU 115. The heterogeneous application 160 may be any suitable application that splits computation between CPU and GPU, such as a machine learning application, a video processing application, or a scientific computing application. The heterogeneous application 160 may include multiple kernels or dispatches, each of which may have different performance characteristics. During operation, the AAPT 125 performs various operations for profiling the application 160, including by utilizing CPU hardware counters 150 and GPU hardware counters 155 to gather profiling data (not shown here) during execution of the application 160.

In the depicted embodiment, the memory 105 further stores and/or executes an operating system 126 and a graphics driver 128. An I/O engine 185 is connected to the bus 110 and a display device 190 is connected to the I/O engine 185. The graphics driver 128 facilitates communication between the GPU 115 and the AAPT 125, and the I/O engine 185 and display device 190 provide output for the applications 160. The input/output (I/O) engine 185 includes hardware and software to handle input or output operations associated with the display 190, as well as other elements of the processing system 100 such as keyboards, mice, printers, external disks, and the like. The I/O engine 185 is coupled to the bus 110, such that the I/O engine 185 communicates with the memory 105, the GPU 115, or the CPU 130. For example, in various embodiments, the GPU 115 renders images according to one or more applications (e.g., application 160) for presentation on the display device 190 via the I/O engine 185. The GPU 115 renders objects (e.g., groups of primitives) according to one or more shader programs to produce values of pixels that are provided to the display 190, which uses the pixel values to display an image that represents the rendered objects.

Figure 2:
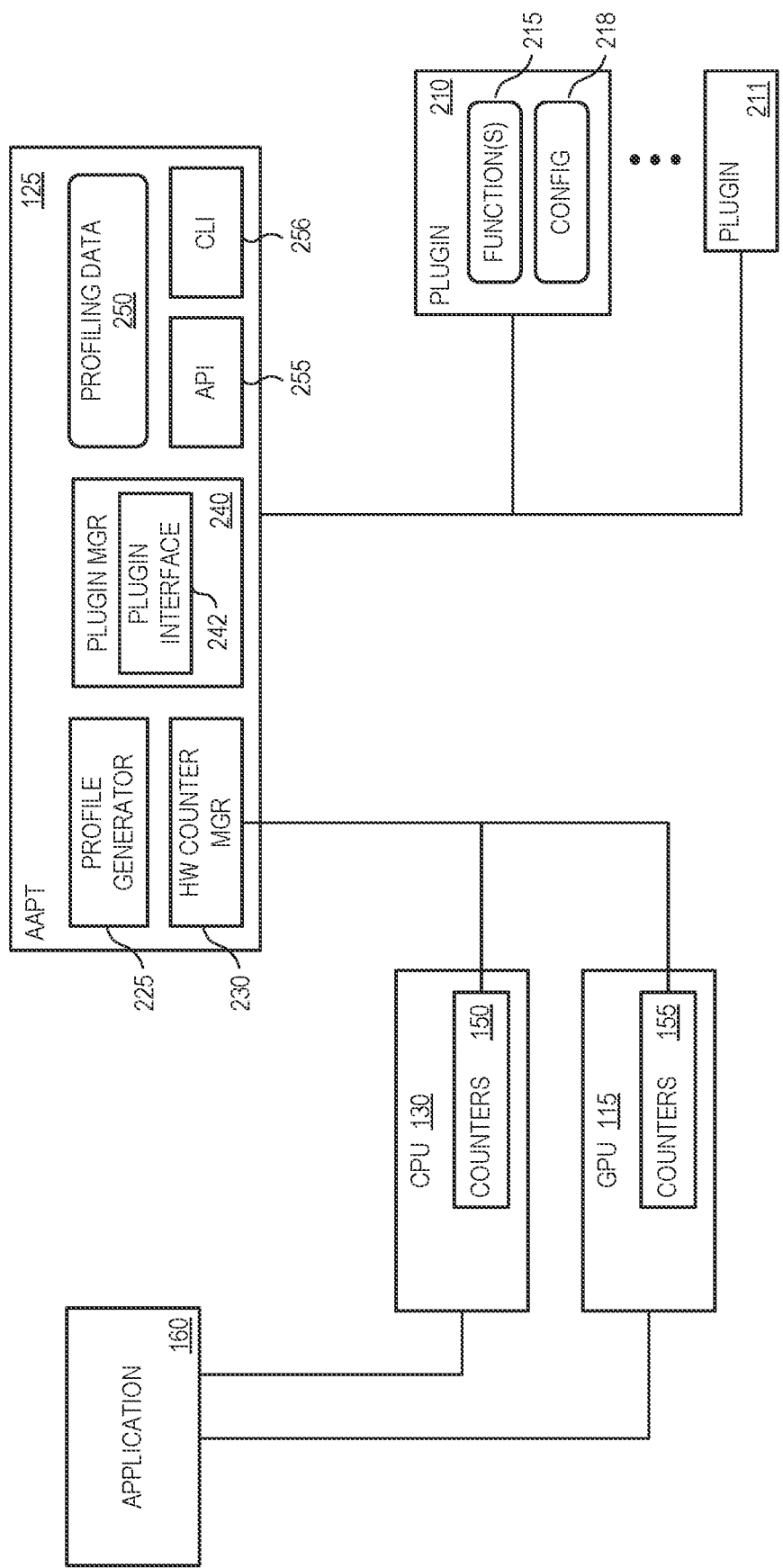
FIG. 2 is a schematic block diagram illustrating a partial component view of the heterogeneous computing system for adaptive application profiling, in accordance with some embodiments.

FIG. 2 is a schematic block diagram illustrating a partial component view of the heterogeneous processing system 100 for adaptive application profiling, in accordance with some embodiments. In particular, FIG. 2 depicts in greater detail the AAPT 125, which is responsible for managing the application profiling process and dynamically modifying individual sets of hardware circuitry (e.g., one or more of CPU hardware counters 150 and GPU hardware counters 155) by which to gather profiling information from both the GPU and CPU during execution of the application 260.

In the depicted embodiment, the AAPT 125 further includes a profile generator 225, which in operation generates profiling data 250 collected during execution of the application program. The hardware counter manager 230 manages retrieving information from the hardware counters and providing that information to the profile generator 225. The AAPT 125 further includes an application programming interface (API) 255 and command line interface 256 to enable developer interaction with the AAPT and access to the profiling data 250. In various embodiments, the AAPT 125 further includes various additional components, not shown herein for clarity, that may each perform a subset of functionality that is attributed herein more directly and generally to the AAPT 125. For example, in certain embodiments the AAPT 125 includes one or more of a filtering component for filtering collected performance data (e.g., as part of generating profiling data 250); a reporting component for generating one or more performance reports based on the filtered performance data; etc.

As depicted, the AAPT 125 provides one or more features/functions via a plug-in architecture. As such, the AAPT 125 includes plug-in manager circuitry 240 responsible for loading and managing various profiling plug-ins 210-211, such as via a plug-in interface 242. (It will be appreciated that although only two plug-ins 210, 211 are depicted, any number of plug-ins may be represented by plug-ins 210, 211.) Each of the plug-ins 210-211 enables one or more additional functions 215 of the AAPT.

In some embodiments, the adaptive application profiling tool 125 may facilitate highly adaptive data collection during profiling runs by allowing optimization engineers to control sampling at runtime, such as by invoking one or more of functions 215. As noted elsewhere herein, in certain embodiments various features and functionality described herein as being enabled by one or more of plug-ins 210, 211 may instead be directly provided by the AAPT 125, such as in embodiments in which no plug-in architecture is implemented, or other embodiments. Conversely, in certain embodiments, various features and functionality described herein as being directly provided by the AAPT 125 may instead be enabled in whole or in part via one or more functions 215 of one or more plug-ins 210, 211.

The following are non-limiting examples of features enabled via plug-in 210 and functions 215 in certain embodiments:

vetoDispatch: This function indicates to the AAPT 125 whether a particular dispatch should be vetoed for data collection, such as based on one or more kernel parameters (not shown), and/or on contents of a command queue associated with the current dispatch. vetoDispatch may be utilized to filter out dispatches that do not meet certain criteria, such as those that are too short or that do not involve a particular kernel. This function provides a way for users to select specific dispatches for data collection, as is useful when dealing with applications that involve millions of dispatches.

getDelay: This function returns a value indicating whether the AAPT 125 should inject artificial delays in executing a specified dispatch. By selecting to artificially delay one or more dispatches, the AAPT 125 facilitates causal profiling by identifying potential effects of improving individual kernel performance on end-to-end application times.

getEvents: This function enables the AAPT 125 to modify or confirm the set of hardware counters to be collected for a specific dispatch, including based on one or more counter results identified in previous dispatches within the same application execution. In this manner, the AAPT enables adaptive modification of sets of hardware counters of interest during a single runtime.

By utilizing these functions, either via one or more of plug-ins 210, 211 and functions 215 or otherwise, the AAPT 125 dynamically steers data collection during runtime to provide guided optimization in a manner that provides greater data collection efficiency than in previous approaches. Use of such features facilitates adaptive data collection. For example, in some embodiments, the AAPT may be configured to collect data only on the longest running kernels or dispatches within a given application, or only when power consumption reaches certain thresholds. Adaptive data collection can also be used to rapidly discover software bottlenecks as the application is running.

Two illustrative examples of AAPT plug-ins are described below.

In a first example, in an embodiment, plug-in 210 provides a profiling approach for capturing only the top k longest-running dispatches. For applications with millions of dispatches, collecting data for each and every dispatch is often unnecessary and can lead to significant overhead. Instead, plug-in 210 collects data for only the longest-running dispatches, allowing for a more targeted and efficient profiling approach. The plug-in accepts an integer k as input and collects data only for the top k longest-running dispatches.

To implement plug-in 210, the vetoDispatch function is used to veto the dispatch if it is not one of the top k longest-running dispatches. In addition, the getEvents function is used to specify and collect the desired hardware counters (e.g., a selected subset of CPU hardware counters 150 and/or GPU hardware counters 155 of FIGS. 1-2) for one or more specified dispatches (e.g., dispatches identified according to one or more specified criteria).

As another independent example, in an embodiment, plug-in 211 provides a profiling approach for capturing data only when power consumption reaches certain thresholds. Such an approach is useful, for example, in scenarios in which power consumption is of relatively high importance, such that it is desirable to optimize performance while staying within identified power limits. In this exemplary embodiment, the plug-in 211 accepts a threshold power value as input and collects data only when the power consumption of the system reaches or exceeds this threshold. To implement this exemplary plug-in 211, the vetoDispatch function is used to veto the dispatch if the current power consumption (as indicated via a specified set of hardware counters) is below the specified threshold.

FIG. 3 illustrates computer-readable code 300 implementing in the Python computing language an example of filtering profiling data based on regular expressions (regex), in accordance with some embodiments. In various embodiments, this regex filtering may be performed by the AAPT 125, such as via a plug-in (e.g., plug-in 210 of FIG. 2) or otherwise, in order to filter dispatches during profiling. In particular, the code 300 may be executed by the AAPT to filter out certain dispatches based on a user-defined regex retrieved via code portion 305.

In code portion 305, the AAPT 125 retrieves a regular expression from an environment variable or, alternatively, prompts a user to enter one.

In code portion 310, the AAPT 125 uses the regular expression to veto non-matching kernel names by enforcing criteria specified for the kernel properties object.

In code portion 315, the AAPT 125 includes support for specifying an artificial kernel delay. However, the regex filtering process is not associated with use of such a delay.

In code portion 320, the AAPT 125 provides launch properties and context for the kernel(s) satisfying the specified criteria enforced in code portion 310. In the depicted embodiment, various such properties and context are specified, including a dispatch identifier, GPU identifier, command queue identifier, process identifier, thread identifier, grid (e.g., a quantity of work items being computed by the dispatch), workgroup, etc.

In code portion 325, the AAPT 125 provides kernel properties for the criteria-satisfying kernel(s), such as a specified quantity of vector and scalar general-purpose registers needed by the indicated kernel ('vgpr' and 'sgpr', respectively).

Figure 4:
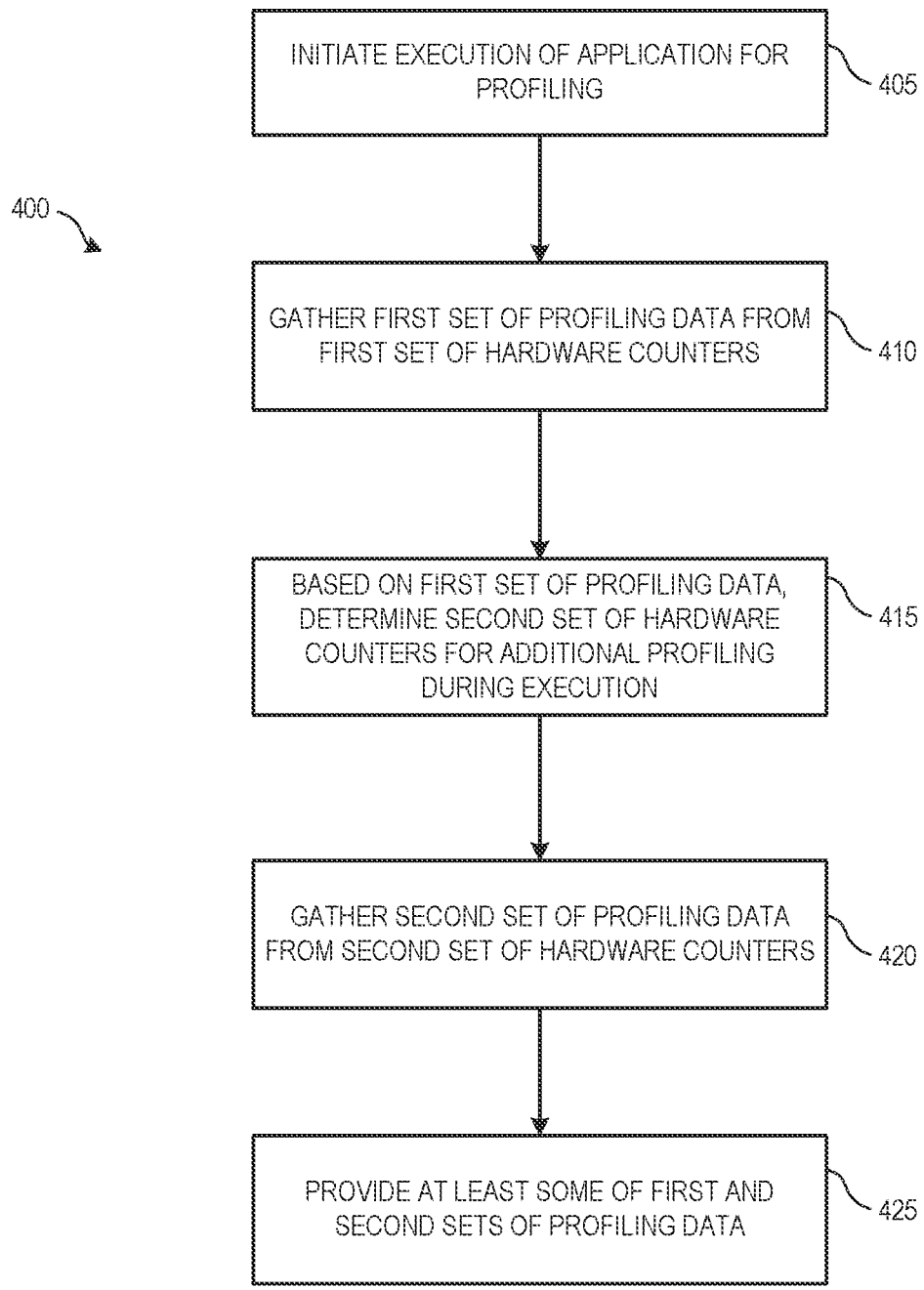
FIG. 4 illustrates an operational routine for adaptively profiling execution of an application during runtime, in accordance with some embodiments.

FIG. 4 illustrates an operational routine 400 for adaptively profiling execution of an application (e.g., application 160 of FIGS. 1 and 2), in accordance with some embodiments. The routine 400 may be performed, for example, by an embodiment of an adaptive application profiling tool (e.g., AAPT 125 of FIGS. 1 and 2).

The routine 400 begins at block 405, in which execution of the application to be profiled is initiated. In certain embodiments and circumstances, the AAPT initiates execution of the application, such as in response to a user input or command. In some embodiments and circumstances, the execution may be initiated externally to the AAPT, such that the AAPT monitors the initiation. The routine 400 proceeds to block 410.

At block 410, the routine 400 gathers the first set of profiling data from the first set of hardware counters and/or other tracking circuitry during the execution of the application. As noted elsewhere herein, the AAPT allows for collecting profiling data selectively based on specific conditions, such as kernel parameters, command dispatch duration, or power consumption. This flexibility enables developers to focus their attention on critical areas of the application and gather more relevant profiling data. For example, instead of collecting data from all available hardware counters for the entire application execution, the AAPT can selectively gather data from specific hardware counters and for specific portions of code (e.g., specific dispatches of one or more indicated kernels), providing a more focused and efficient profiling process. This targeted data collection approach may reduce the amount of data generated, making it easier to analyze and interpret the profiling results. The routine proceeds to block 415.

At block 415, the AAPT determines a second set of hardware counters for additional profiling based on the first set of profiling data acquired during execution of the application. In various embodiments, this determination to modify the set of hardware counters from which data is collected is made dynamically during the execution of the application. Such dynamic determinations enable the AAPT to adjust its profiling approach during application runtime based on performance characteristics of the application during that same execution. It will be appreciated that while this and other scenarios described herein relate to adaptive profiling of an application during a single execution of that program, in various embodiments the AAPT may additionally base its dynamic behavior and configuration on other executions of the application being profiled, including prior or concurrent executions. The routine proceeds to block 420.

At block 420, the AAPT gathers the second set of profiling data from the second set of hardware counters. Collecting such additional data during the same execution of the application as the first set enables a comprehensive view of the application's performance. In addition, in certain scenarios and embodiments the specific profiling data being collected may be modified based on dynamic and/or computed criteria during a single execution cycle, enabling the collection of that profiling data with relatively low overhead. The routine proceeds to block 425.

At block 425, the routine 400 provides at least some of the first and second sets of profiling data as output. In various embodiments and scenarios, the provision of such data includes analysis, optimization, and reporting facilities related to the executing application's performance.

In some embodiments, the apparatus and techniques described above are implemented in a system including one or more integrated circuit (IC) devices (also referred to as integrated circuit packages or microchips), such as the adaptive application profiling tool described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
collecting, by one or more processors, a first set of profiling data for an application from a first set of tracking circuitry during one execution of the application by the one or more processors;
determining, by the one or more processors during the one execution of the application and based on the first set of profiling data collected from the first set of tracking circuitry, a second set of tracking circuitry to use for collecting additional profiling data for the application, the second set of tracking circuitry being distinct from the first set of tracking circuitry;
collecting, by the one or more processors and during the one execution of the application, a second set of profiling data for the application from the second set of tracking circuitry, the second set of profiling data being distinct from the first set of profiling data; and
delaying, by the one or more processors, execution of one or more kernel commands based at least in part on one or more portions of profiling data of the first and second sets of profiling data.

2. The method of claim 1, wherein the one or more processors include multiple processors, and wherein collecting the first set of profiling data for the application from the first set of tracking circuitry comprises collecting data from one or more hardware counters associated with multiple types of processors.

3. The method of claim 1, wherein the one or more processors comprise at least one central processing unit (CPU) and at least one graphics processing unit (GPU).

4. The method of claim 1, wherein determining the second set of tracking circuitry includes determining the second set of tracking circuitry using one or more functions of an extended code module that is communicatively coupled to an adaptive application profiling tool (AAPT) that performs one or more steps of the method.

5. The method of claim 1, wherein determining the second set of tracking circuitry comprises determining the second set of tracking circuitry based on one or more kernel parameters associated with a command dispatch.

6. The method of claim 1, wherein the second set of profiling data for the application is collected for only a subset of command dispatches, the subset of the command dispatches being based on a respective duration of the command dispatches.

7. The method of claim 1, wherein the second set of profiling data for the application is collected for only a subset of command dispatches, the subset of the command dispatches being based on a power consumption of at least one processor of the one or more processors.

8. A non-transitory computer-readable storage medium storing instructions that, when executed by one or more processors, manipulate the one or more processors to:
collect a first set of profiling data for an application from a first set of tracking circuitry during one execution of the application by the one or more processors;
determine, during the one execution of the application and based on the first set of profiling data collected from the first set of tracking circuitry, a second set of tracking circuitry to use for collecting additional profiling data for the application, wherein the second set of tracking circuitry is distinct from the first set of tracking circuitry;
collect, during the one execution of the application, a second set of profiling data for the application from the second set of tracking circuitry, wherein the second set of profiling data is distinct from the first set of profiling data; and delay execution of one or more kernel commands based at least in part on one or more portions of profiling data of the first and second sets of profiling data.

9. The non-transitory computer-readable storage medium of claim 8, wherein the one or more processors include multiple processors, and wherein to collect the first set of profiling data for the application from the first set of tracking circuitry includes to collect data from one or more hardware counters associated with multiple types of processors.

10. The non-transitory computer-readable storage medium of claim 8, wherein the one or more processors comprise at least one central processing unit (CPU) and at least one graphics processing unit (GPU).

11. The non-transitory computer-readable storage medium of claim 8, wherein to determine the second set of tracking circuitry includes to determine the second set of tracking circuitry using one or more functions of an extended code module.

12. The non-transitory computer-readable storage medium of claim 8, wherein to determine the second set of tracking circuitry includes to determine the second set of tracking circuitry based on one or more kernel parameters associated with a command dispatch.

13. The non-transitory computer-readable storage medium of claim 8, wherein the second set of profiling data for the application is collected for only a subset of command dispatches, and wherein the subset of the command dispatches is based on a respective duration of the command dispatches.

14. The non-transitory computer-readable storage medium of claim 8, wherein the second set of profiling data for the application is collected for only a subset of command dispatches, and wherein the subset of the command dispatches is based on a power consumption of at least one processor of the one or more processors.

15. A profiling apparatus comprising:
one or more processors, the one or more processors comprising:
 a first set of tracking circuitry configured to collect a first set of profiling data for an application during one execution of the application by the one or more processors; and
 a second set of tracking circuitry distinct from the first set of tracking circuitry, wherein the second set of tracking circuitry is determined based on the first set of profiling data collected from the first set of tracking circuitry during the one execution of the application; and
a data collection module communicatively coupled to the second set of tracking circuitry and configured to collect a second set of profiling data for the application from the second set of tracking circuitry during the one execution of the application, wherein the second set of profiling data is different than the first set of profiling data; and
wherein the one or more processors are configured to delay execution of one or more kernel commands based at least in part on one or more portions of profiling data of the first and second sets of profiling data.

16. The profiling apparatus of claim 15, wherein the one or more processors comprise multiple types of processors that are each associated with at least a portion of the first set of tracking circuitry and at least a portion of the second set of tracking circuitry.

17. The profiling apparatus of claim 15, further comprising an adaptive application profiling tool (AAPT) configured to execute on at least one processor of the one or more processors, wherein the AAPT utilizes the first set of profiling data for the application to determine the second set of tracking circuitry during the one execution of the application.

* * * * *